UNITED STATES PATENT OFFICE

TENNEY L. DAVIS, OF NORWELL, MASSACHUSETTS

DI-ALKYL UREA

No Drawing.   Application filed November 5, 1927. Serial No. 231,386.

(GRANTED UNDER THE ACT OF MARCH 3, 1883, 22 STAT. L., 625)

The invention described herein may be used by the Government, or any of its officers or employees in prosecution of work for the Government, or by any other person in the United States, without payment to me of any royalty thereon, in accordance with the act of March 3, 1883.

The subject of this invention is a process for the preparation of symmetrically substituted di-alkyl ureas and is in part a continuation of applicant's former application, Serial No. 697,949, filed March 8th, 1924.

Sym-di-alkyl ureas are useful as solvents for nitrocellulose and their use as colloiding agents for nitrocellulose and surface coatings for colloided smokeless powders have been made the object of earlier patent applications.

The standard method for the preparation of such substances consists in treating phosgene with an excess of a primary aliphatic amine. Hydrochloric acid is eliminated and combines with the excess amine while di-alkyl urea is formed at the same time, thus,

This process suffers from the disadvantage that phosgene is exceedingly poisonous and difficult to handle safely.

Urea itself can conveniently be made and indeed is now made from the products which result from the fixation of atmospheric nitrogen and can consequently be had cheaply and in any desired amount. When urea is heated (a convenient temperature is 160° C., though such a temperature is not essential) it dissociates into ammonia and isocyanic acid. The latter will combine with primary amines to form monoalkyl ureas. These monoalkyl ureas also will dissociate or dearrange on heating, forming, on the one hand, primary amine and isocyanic acid, and on the other, ammonia and alkyl isocyanate. The alkyl isocyanate will combine with the primary amine to form the sym-di-alkyl urea. The net result of the course of reaction may be symbolized as follows:

I have discovered that urea heated with an excess of a primary aliphatic amine, as, for example, methylamine, ethylamine, butyl amine, and the others, yields the corresponding sym-di-alkyl urea. The process may be carried out conveniently by heating the two substances together. A convenient temperature at which to carry out the process is 160° C., though this specific temperature is not essential. Ammonia escapes and the di-alkyl urea remains behind. If the amine is very volatile, a salt of the amine may be used, as for instance, the hydrochloride. When the urea and the primary amine salt, for example the hydrochloride, are heated together at, say 160° the sym-di-alkyl urea is formed and remains in the reaction product along with the ammonium chloride. While I have found that 160° is convenient temperature for the process, I do not wish to claim that any particular temperature is best as any temperature within a reasonable range, for instance, from 100° C. to 170° C. may be used with good results.

I claim:

1. The process for the preparation of sym-di-alkyl ureas which consists in heating urea in the presence of a primary amine of the aliphatic series to a temperature of reaction.

2. The process for the preparation of sym-di-alkyl urea which consists in heating urea in the presence of a salt of a primary amine of the aliphatic series to a temperature of reaction.

3. The precess for the preparation of sym-di-alkyl urea which consists in heating urea in the presence of a hydrochloride of a primary amine of the aliphatic series to a temperature of reaction.

4. A process for the preparation of sym-di-alkyl urea which consists in heating urea in the presence of an excess of a primary amine of the aliphatic series to a reaction temperature.

5. The process for the preparation of a sym-di-alkyl urea, which consists in heating urea in the presence of an excess of a salt of a primary amine of the aliphatic series to a temperature of reaction.

6. The process for the preparation of sym-di-alkyl urea which consists in producing a chemical reaction between urea and a primary amine of the aliphatic series by heating to a temperature of approximately 160° C.

7. The process for the preparation of sym-di-alkyl urea which consists in heating urea in the presence of a salt of a primary amine of the aliphatic series to a temperature of approximately 160° C.

TENNEY L. DAVIS.